United States Patent Office 3,131,129
Patented Apr. 28, 1964

3,131,129
FUEL ELEMENTS FOR USE IN NUCLEAR REACTORS
Ian Hugh Morrison, Preston, England, assignor to United Kingdom Atomic Energy Authority, London, England
Filed Oct. 15, 1956, Ser. No. 616,067
Claims priority, application Great Britain Oct. 14, 1955
4 Claims. (Cl. 176—68)

This invention relates to fuel elements for use in nuclear reactors.

The customary form of fuel element used to date in nuclear reactors comprises a short fissile fuel member, such as a rod of uranium about twelve inches long, totally enclosed by a protective sheath of aluminum in close contact with the fuel member to provide good heat transfer properties to the sheath. An interest now exists in magnesium and magnesium alloy as a sheath material which is to be operated under high pressures (100 lbs. p.s.i.). It has been found that the large coefficient of thermal expansion of magnesium relative to uranium coupled with softening and deformation under pressure introduces a longitudinal stretching of the sheath which is partially cumulative on each thermal cycle traversed by the fuel element. This stretching is attributed to the fact that the sheath expands longitudinally on heating more than the fuel member but on cooling friction forces between the sheath and the fuel member made substantial by external pressure and especially by depression of the expanded sheath ends prevent the free contraction of the sheath so that it is subjected to a residual stretch which is not fully accommodated on the next heating cycle. Repeated thermal cycling increases this residual stretch cumulatively until the sheath fractures.

The present invention sets forth a fuel element wherein this undesirable property of cumulative stretching of the sheath is reduced in magnitude.

The fuel element of the present invention comprises a fuel member enclosed in a close-fitting protective sheath wherein said member is provided with a series of spaced concavities on its surface in contact with the sheath and the sheath is indented into said spaced concavities.

Figure 1:
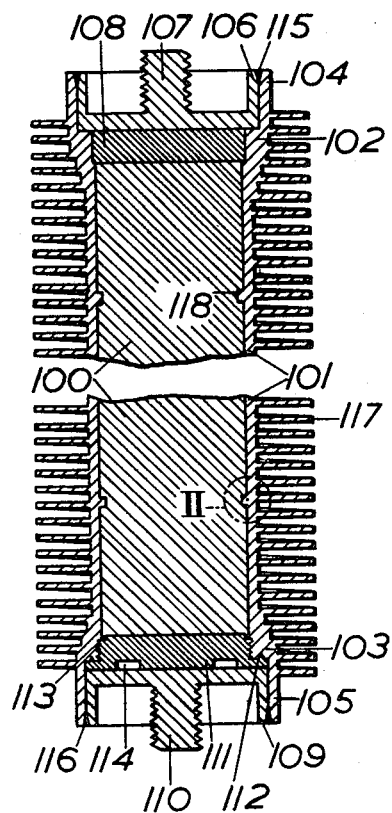
Figure 2:
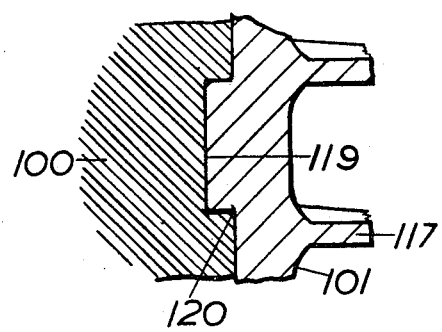

A fuel element embodying the invention will now be described with reference to the accompanying drawing wherein FIG. 1 is a sectional view of the fuel element and FIG. 2 is an enlarged view of that part of FIG. 1 contained within the circle II of FIG. 1.

In FIG. 1 a circular section rod 100 of natural uranium which is 1.15″ diameter and 3′4″ long, is sheathed in a magnesium can 101. The can 101 has a length of 3′5¼″, the excess length over the rod 100 being made up of finned parts 102 and 103 and sealing flanges 104 and 105. At the top end of the fuel elements there is an end cap 106 with a screwed plug 107 and a magnesium alloy (0.65% manganese) disc 108 which is ¼″ thick. (The alloying gives superior creep strength relative to the sheath.) At the bottom end of the fuel element there is an end cap 109 with a screwed plug 110 and a magnesium alloy (0.65% manganese) disc 111 which is also ¼″ thick. The disc 108 is plain and the disc 111 has a knife-edged flange 112, a thread 113 and spanner sockets 114. The diameter of the discs 108 and 111 is slightly greater than that of the rod 100 to avoid the possibility of the can 101 creeping over the end faces of the rod 100. Argonarc welds 115 and 116 are provided. The caps 109 and 106 are made of the same material as the can 101.

The can 101 is machined out of solid bar to provide helical fins 117 having a diameter of 2⅛″, a pitch of ⅛″ and a thickness of 1/32″.

The rod 100 is provided with a series of spaced concavities in the form of circumferential grooves 118. Eleven central grooves 118 are provided 3.333 inches apart and the end two grooves 118 (i.e. thirteen grooves altogether) are spaced one inch from the ends of the rod and are therefore 2.333 inches from the adjacent central grooves. The width of the grooves is 0.1 inch and the depth is 0.02 inch. The sheath 101 is pressurized on to the rod 100 so as to be indented as shown at 119 in FIG. 2.

The rod 100, which has been formed by casting, is machined to size and the grooves 118 are then machined and after testing for straightness and inspection it is washed and dried. The sheath 101 is similarly washed, dried and inspected.

The flange 105 and cap 109 are surface prepared for welding; the disc 111 is screwed into place, the cap 109 inserted and welded into position along 116.

The rod 100 is held vertically whilst the can is pushed over the rod with gentle pressure and the can flange 104 is machined back to size relative to the exposed end of the rod 100. The disc 108 is inserted followed by the cap 106 which is welded along 115.

For the pressurising operation to drive the can into the grooves 118 the sealed element is placed in a pressure vessel and the vessel is evacuated. The pressure inside the vessel is then raised to approximately 100 pounds per square inch with dry carbondioxide gas followed by a uniform heating to 500° C. over a period of three hours. The heating causes the pressure to rise to 350 pounds per square inch and this pressure is maintained for four hours. Cooling is arranged to take place uniformly down to 100° C. over three hours and the pressure is then released and the assembled element removed.

An X-ray examination can be used to show that the sheath 101 has been indented at 119 into the grooves 118.

Whilst the invention has been described in relation to circumferential grooving other ways of making concavities are practicable such as, indenting by a series of shallow drillings or by partial grooving. The depth of groove relative to its width and the thickness of the sheath 101 is critical in that generally thinning of the sheath is undesirable. FIG. 2 of the drawings shows for example some thinning radially from the point marked 120, but this is not significant (the sheath thickness being 80 thou. as compared with the groove depth of 20 thou. and width of 100 thou.). Thinning can be reduced by chamfering the grooves 118 but the "bite" given by the straight-wall groove is thought to be advantageous. With straight-wall grooving the depth of groove is preferably within the range of one fifth to one third and preferably one quarter of the sheath thickness in the vicinity of the groove to provide adequate grip on the hand and tolerable thinning on the other hand. Pressurising condition may be varied from those stated above due regard being given to the need not to upset the metallurgical stability of the rod 101 and the need to obtain uniform heat transfer as far as possible between sheath 101 and rod 100. A gap between the indented sheath at 119 and the groove 118 for example may give rise to a hot spot in the uranium.

The distance the grooves (or other indentations) are spaced apart is preferably made as large as possible but still to give the desired result of avoiding cumulative stretching of the sheath to fracture point within the life of the fuel element. Closer spacing results in a costlier product and a reduction in uranium quantity.

I claim:

1. A nuclear reactor fuel element comprising a fuel rod and a protective sheath in which the fuel rod is secured, the fuel rod and protective sheath having mutually opposing longitudinal walls in contact with one another, the longitudinal wall of the fuel rod having a series of spaced recesses therein and the longitudinal wall of the protective sheath having a corresponding series of inwardly directed protrusions thereon each engaged in one of said recesses, and a pair of caps closing the ends of the sheath.

2. A nuclear reactor fuel element according to claim 1 wherein the fuel rod is cylindrical and the recesses are circumferential grooves having a rectangular section.

3. A nuclear reactor fuel element according to claim 1 further comprising a disc of non-fissile material disposed between each end of the fuel rod and the adjacent end cap of the protective sheath, each said disc having a diameter greater than that of the fuel rod.

4. A nuclear reactor fuel element according to claim 1 wherein the protective sheath has external fins thereon.

References Cited in the file of this patent

UNITED STATES PATENTS

| | | |
|---|---|---|
| 1,236,145 | Burns | Aug. 7, 1917 |
| 1,652,835 | Pierce | Dec. 13, 1927 |
| 1,775,055 | Tarbox et al. | Sept. 2, 1930 |
| 2,272,244 | Klein | Feb. 10, 1942 |
| 2,393,036 | Farr | Jan. 15, 1946 |
| 2,683,928 | Carson | July 20, 1954 |
| 2,741,498 | Elliott | Apr. 10, 1956 |
| 2,755,112 | Klancnik | July 17, 1956 |
| 2,825,689 | Szilard et al. | Mar. 4, 1958 |
| 2,885,335 | Moore et al. | May 5, 1959 |

OTHER REFERENCES

Nucleonics, June 1955, vol. 13, No. 6, page 93.

Gurinsky et al.: P/828 Proceedings of the International Conference on the Peaceful Uses of Atomic Energy, Geneva, August 1955, vol. 9, pp. 221–230.